United States Patent [19]

Couderc et al.

[11] 4,286,760
[45] Sep. 1, 1981

[54] PHOTOELECTRIC DIRECTION FINDER

[75] Inventors: Georges Couderc; Yves Cojan; Jean-Louis Beck, all of Paris, France

[73] Assignee: Thomson-CSF, Paris, France

[21] Appl. No.: 19,697

[22] Filed: Mar. 12, 1979

[30] Foreign Application Priority Data

Mar. 14, 1978 [FR] France ................. 78 07276

[51] Int. Cl.³ .............................................. F41G 7/00
[52] U.S. Cl. ........................... 244/3.16; 250/203 R
[58] Field of Search ................. 244/3.16, 3.13; 250/203 R

[56] References Cited

U.S. PATENT DOCUMENTS

| | | | |
|---|---|---|---|
| 3,076,095 | 1/1963 | Becklund et al. | 244/3.16 |
| 3,642,233 | 2/1972 | Bezerie | 244/3.16 |
| 3,944,167 | 3/1976 | Figler et al. | 244/3.16 |
| 4,006,356 | 2/1977 | Johnson et al. | 244/3.16 |
| 4,009,393 | 2/1977 | Ashley, Jr. et al. | 244/3.16 |
| 4,030,807 | 6/1977 | Briney | 244/3.16 |
| 4,039,246 | 8/1977 | Voigt | 244/3.16 |
| 4,131,254 | 12/1978 | Underwood | 244/3.16 |

FOREIGN PATENT DOCUMENTS 1355326  6/1974  United Kingdom ............... 244/3.16

Primary Examiner—Charles T. Jordan
Attorney, Agent, or Firm—Edwin E. Greigg

[57] ABSTRACT

A direction finder including downstream the reticle an intermediate objective and a four quadrant detector, the reticle providing a modulation at a given frequency and in which the intermediate objective comprises preferably a half-ball lens whose center of curvature coincides substantially with the detector center to allow a relative movement of the reticle with respect to the detector, such as a rotation round this center controlled by a driving device.

17 Claims, 11 Drawing Figures

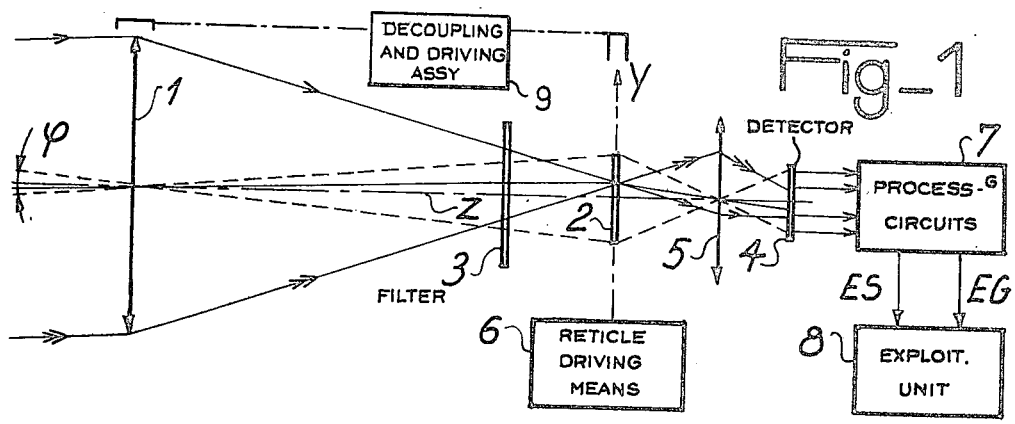
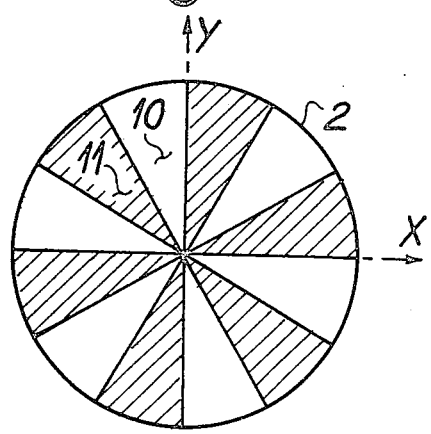
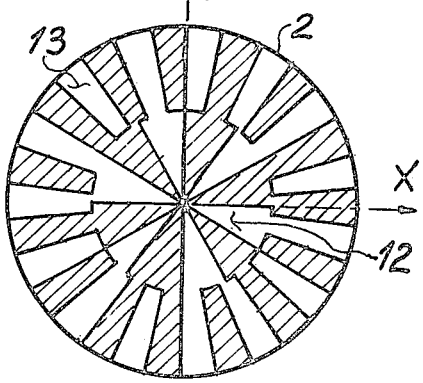
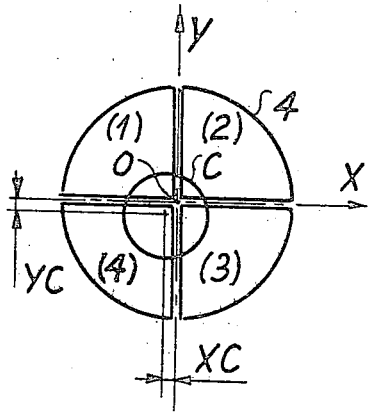
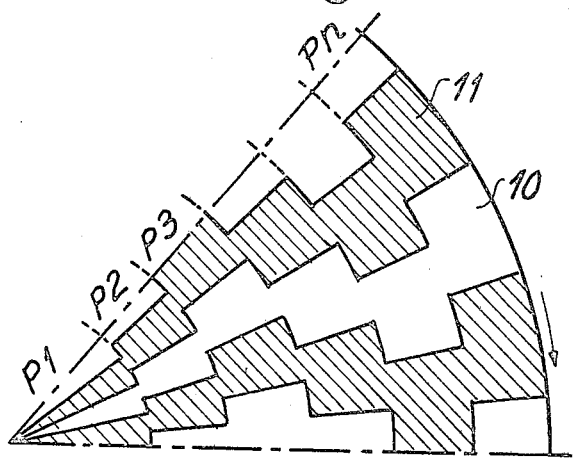

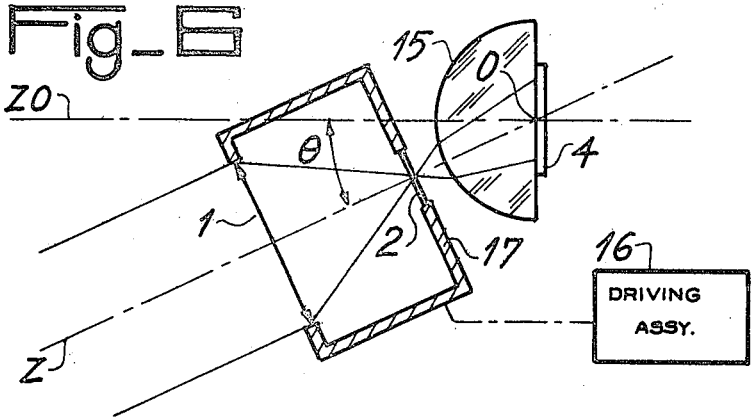
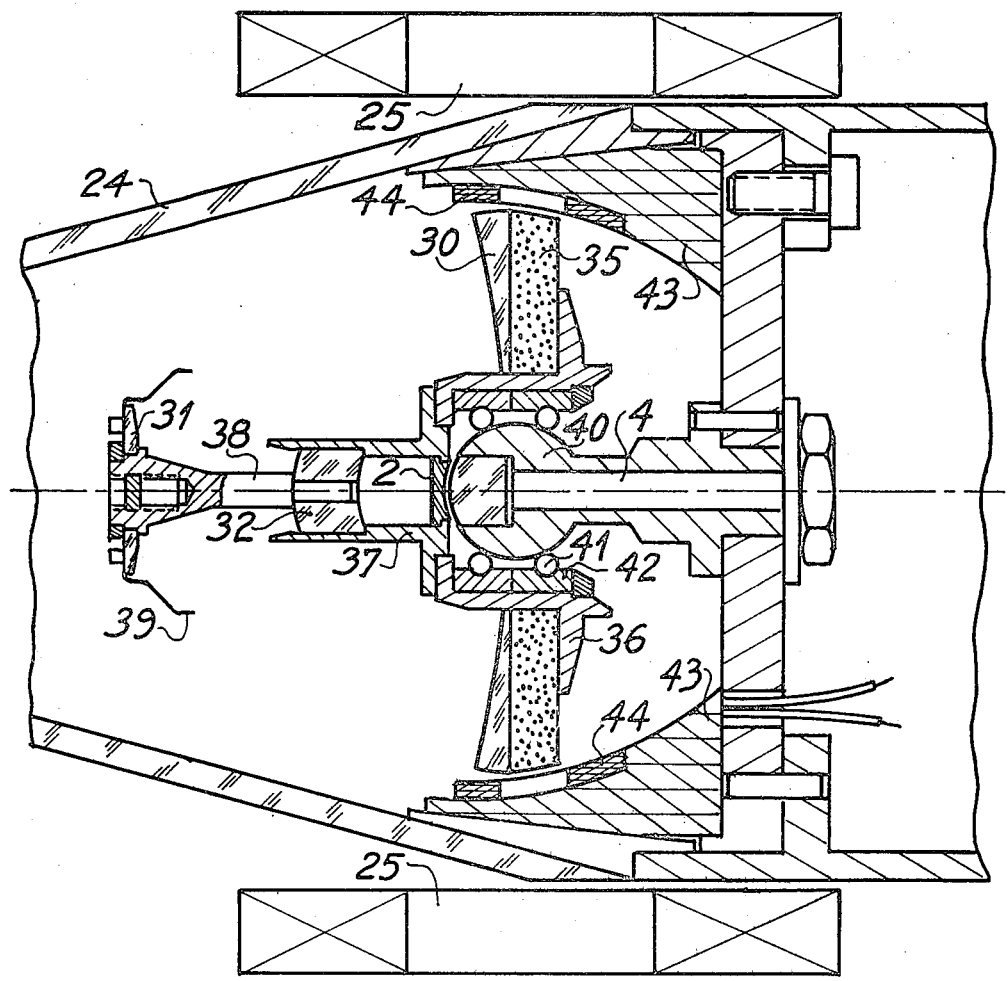

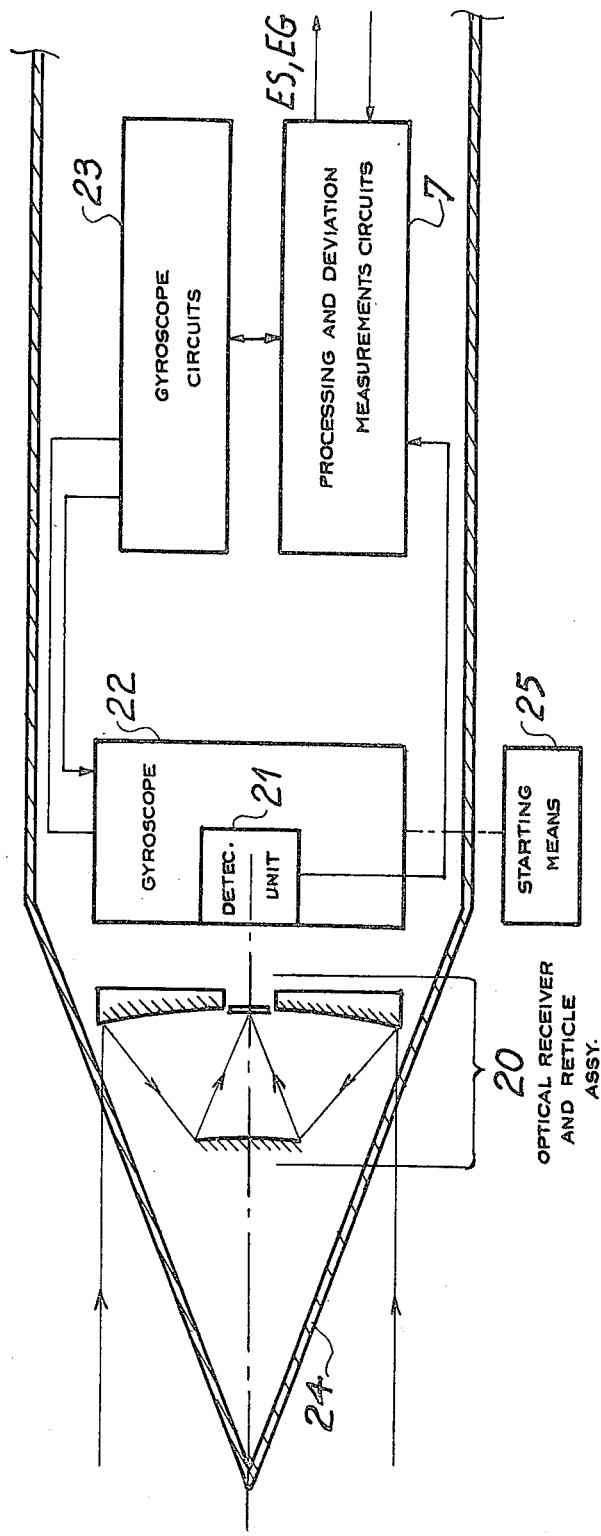

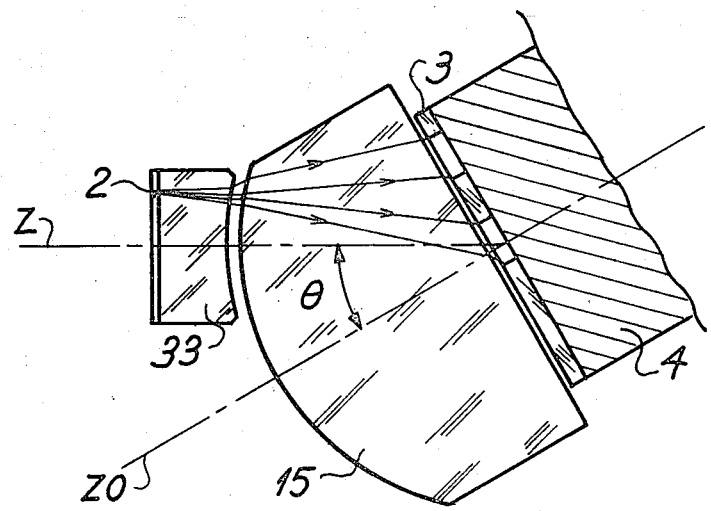
Fig_9
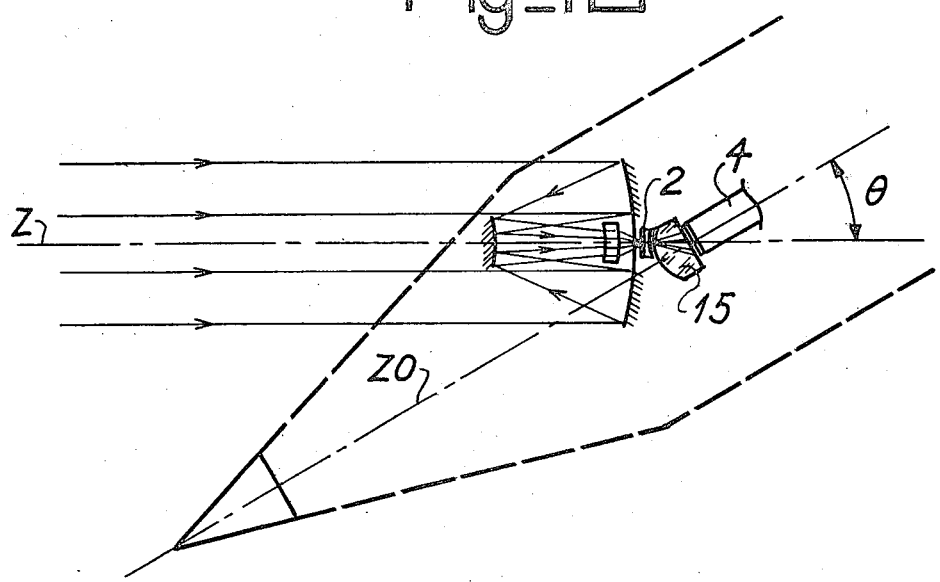
Fig_10

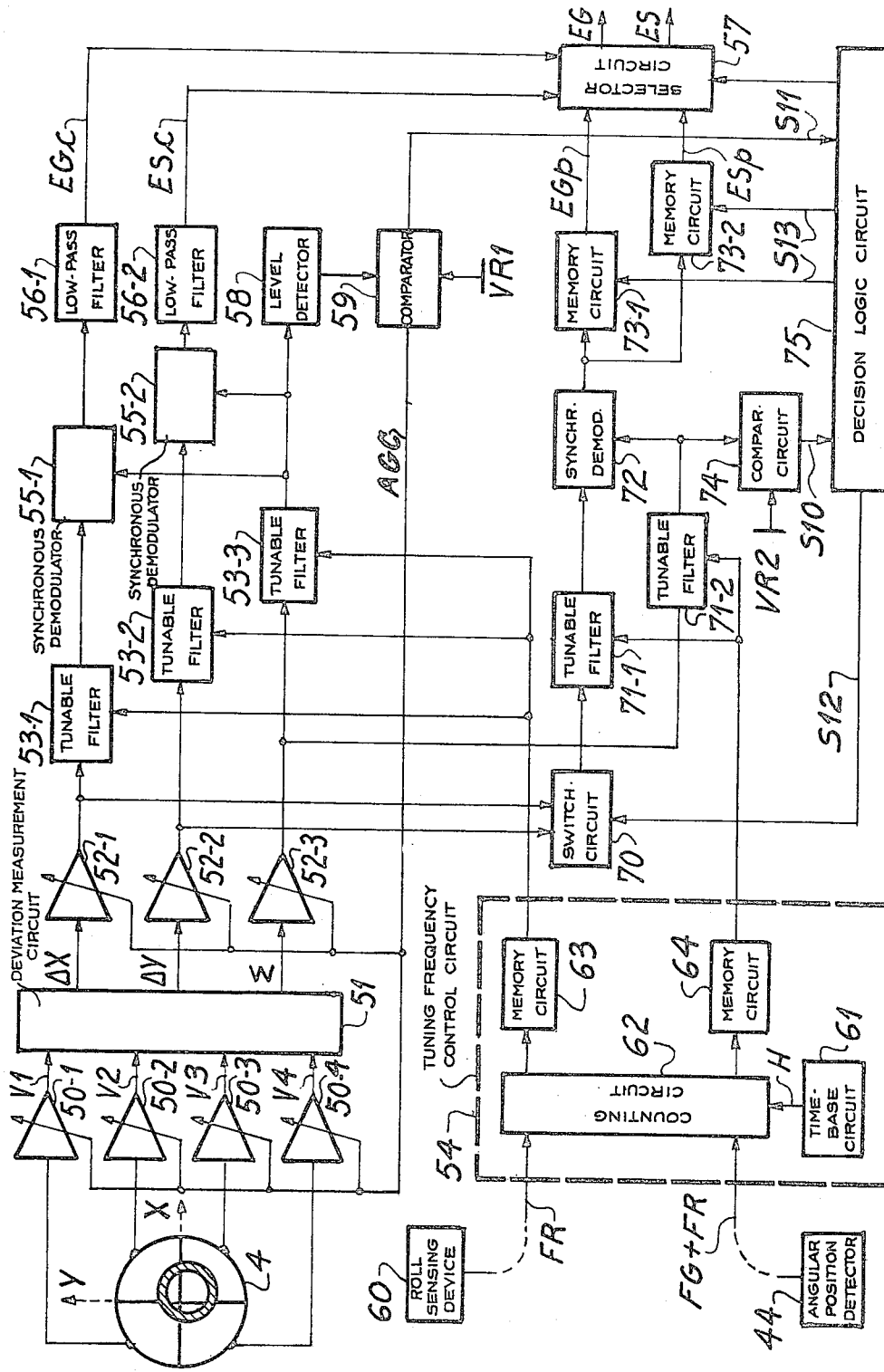
Fig_11

PHOTOELECTRIC DIRECTION FINDER

The present invention relates to photoelectric direction finders.

The invention is applicable in particular in the field relating to the opto-electrical detection and tracking of an expected light-radiating object formed by a target which either emits light or is remotely illuminated. It is also applicable to the automatic guidance of a projectile such as a homing missile.

The invention relates to a system which enables a target to be detected and angularly located in an observed field by generating error signals which are in relation with the angle between the sighting axis of the system and the direction in which the target lies. The target is generally formed by a moving object such as an aircraft, projectile, missile, tank etc. The light which is emitted or reflected by the target towards the direction finder system enables one to follow the movement of the target while maintaining optical contact in infrared, visible or ultra-violet light. In the focal plane, the field of the optical receiver defines a useful detection area which is centered on the optical axis or sighting axis of the finder system. Thus, any radiating object lying in the solid observation angle provides an image on the detection area whose cartesian coordinates correspond to azimuth and elevation parameters and are representative of the aiming error.

In such systems, an optical receiver is associated with a photoelectric detector to allow the light radiation coming from the observed field of predetermined angular extent which is centered on the optical sighting axis to be focused and detected. The received radiation consist of useful radiation originating from the light point source to be detected, and of interference radiation which is produced by external interference sources, solar radiation in particular.

The useful radiation is generally distinguishable by in particular, its spectral and physical characteristics, that is to say on the one hand, that it lies within the planned operating waveband and on the other hand, that the image of the useful object in question which is formed by an optical entry objective of the receiver on the photo-sensitive surface of a detector has determined dimensional characteristics. The spectral and spatial characteristics of interference sources are generally considerably different from those of the useful object.

To increase the signal-to-noise ratio at detection it is known to undertake a spectral filtering by means of optical filters inserted in the optical path. It is also known to modulate the incident radiation by means of a reticle alternating opaque and transparent areas whose shape and dimensions are most closely matched to the shape of the point source image so as to provide suitable spatial filtering. The recticle is arranged in the focal plane and moved to produce a predetermined modulation of the detected signal and the receiver circuit downstream of the detector contains a suitable processing circuit to undertake a corresponding filtering operation.

Such a homing system is already known in which the reticle produces a modulation frequency and is followed by an optical objective which produces an image of the field in the plane of a detector assembly which comprises a four quadrant detector. The reception channels coming from the respective quadrants are processed to demodulate the signals detected and produce the deviation measurement signals corresponding to the angular offset of the target with respect to the line of sight. In such a set-up the space filtering and modulation functions due to the reticle are separate from those of deviation measurement due to the detector and associated circuits.

In all these systems the deviation measurement signals corresponding to the polar or cartesian coordinates of the target image are then used as a function of the application proposed; in particular they may be used to produce a display or for the servo-control of the system's optical line of sight to track the assigned target.

One object of the invention is to provide a direction finder system of the type mentioned in which the functions of space filtering and modulation are separate from those of deviation measurement and in which mechanical decoupling is produced between the objective and reticle assembly and the detection part, this last property being advantageously used in accordance with another object of the invention, to realize a passive infrared homing apparatus.

The invention will be described by way of example with reference to the accompanying drawings in which:

FIG. 1 is a simplified diagram of a direction finder in accordance with the invention, FIG. 2 is a schematic diagram of the photoelectric detector device used, FIGS. 3 to 5 are diagrams of embodiments of the reticle in the form of a disc, FIG. 6 is a simplified diagram of the system in FIG. 1 so arranged as to produce relative rotation between the reticle and the detector, FIG. 7 is a simplified block diagram of an application to a homing system, FIGS. 8 to 10 are diagrammatic views related to the opto-mechanical part of the system as in FIG. 7, and FIG. 11 is a diagram of the electronic processing and deviation measurement circuits of a direction finder in accordance with FIGS. 4 to 10.

In the diagram in FIG. 1, are shown the essential elements of the combination forming the photoelectric direction finder system. These elements include: a reception optical objective 1 symbolized by a lens which provides the focusing of the radiation received in the observation field, which is centered on the optical axis Z and has an aperture $\psi$, a sweep device with a reticle 2 arranged in the focal plane to produce the space filtering and modulation function; an optical filter 3 fitted in the optical path to filter the radiation included in the useful optical field; and a photoelectrical detector device 4. The latter device is placed at a distance from the reticle plane and an intermediate optical objective 5 forms the field image substantially to the level of the detection plane. The block 6 symbolizes a driving device for rotating the reticle 2.

According to the invention, a single detector device 4 is used of the four quadrant detector type, the quadrants feeding respectively four input channels of the reception circuits 7. The signals detected in each channel are processed by filtering as a function of the modulation produced by the reticle and by summing and subtracting for all the channels to produce the deviation measurement. The deviation measurement signals, which are two in number, generally correspond to the elevation deviation ES and bearing deviation EG of the target with respect to the optical line of sight Z. They are transmitted to an auxiliary operating unit 8. A detector with four quadrants (1), (2), (3) and (4) is shown as a reminder in FIG. 2. The deviation measurement signals ES and EG correspond respectively to the coordinates YC and XC of the centre of the spot image C of the target with respect to the cartesian axes OY, considered as vertical, and OX, considered as horizontal. The point 0, which is the center of the detector, corresponds to the trace of the optical axis Z, which is perpendicular to the detector plane.

Rotatable reticle 2 may be in the form of a single circular track with opaque and transparent zones along direction Y, which are moved along the crosswise direction X, to give a corresponding modulation of the focused beam. But, this solution requires a fairly large support disc and, productions of the type with a centered disc, which are more compact and easier to use within the framework of a homing apparatus application, are considered. FIG. 3 shows a simple way of providing a disc centred reticle. A single track is formed of transparent and opaque sectors, 10 and 11, of the same dimensions, alternately. A modulation results at a frequency F1, which is determined by the number of sectors and the instantaneous rotational speed of the disc.

FIG. 4 shows the same disc arranged to provide two optical tracks, a central one 12 corresponding to the one already described but only covering a limited center zone and an adjacent circular one 13 covering the remaining zone of the field image. On this second track, which is called peripheral, the sectors are truncated and correspond to an angle at the center which is smaller than that of the sectors in the central track. This gives a second modulation frequency F2, which is higher than F1. The peripheral track is designed to give a ratio of k/1 between frequencies F2 and F1, k being chosen to be greater than 1 and such as to avoid harmonic frequencies. In the example shown, F2=2.5 F1. In this design, the operations to filter signals detected in circuits 7 enable the partial or total presence of the target image to be identified directly in the central zone or in the peripheral zone and this property may be used to maintain correct aim of the system and reduce the risks of losing the target aimed at. The central zone corresponds to a reduced observation field, which is centered on the line of sight Z and is inside the whole fields observed. Another advantage resulting from this layout of tracks is an increase in the homogeneity of the space filtering which cannot be obtained in configurations with sectors other than approximately because of the big variation in the width of the zones presented between the center and periphery of the disc.

FIG. 5 shows in the form of a part schematic diagram a preferred variant in the way of making the designs of the sectors of tracks 10 and 11 in FIG. 3. This variant is evidently just as applicable to each of tracks 12 and 13 on the disc with two tracks as in FIG. 4. Sectors 10 and 11 are subdivided into several concentric tracks P1 to Pn, which are offset one with respect to another. In accordance with the example shown, the angular offset is of the same absolute value from one track to the next and corresponds to a shift of $\pi/2$ between the corresponding modulations of the same frequency F1, the direction of the offset has been chosen to give in succession the phase shifts $\pi/2$, $\pi$, $3\pi/2$ and $2\pi$ or 0 and so on with respect to the original track considered. Hence, the signal variation may follow a roughly sinusoidal law for a fast radial movement of the target image. This arrangement enables a big reduction in detection ambiguities or false alarms to be obtained by a very effective space filtering of large sized interference sources which a radially oriented image and would be likely to be detected as useful signals. Also, a greater homogeneity of the useful signal is obtained allowing for the fact that, in preceding configurations, the modulation may be altered as a function of the speed of revolution and trajectory of the target, in particular in the case of rapid radial trajectories which pass near the center of rotation.

Allowing for the separation of the space filtering and modulation function by the reticle and of the deviation measurement function by the detector and processing circuits, it is not necessary to synchronize between them the rotation of the reticle and the demodulation obtained by frequency filtering.

In accordance with the invention, means represented by 9 in FIG. 1 are provided for the purpose of taking advantage of the separation of functions and producing a mechanical decoupling between the part, reception optical objective and reticle, and the part intermediate optical objective and detector. An example of arrangement corresponding to this is shown in FIG. 6. The intermediate optical objective, called the deviation measurement part, is so designed as to retain the same image transposing function when the relative position between the parts mentioned is changed. The relative movement concerned is a rotational movement round the center 0 of the detector plane. The intermediate optical objective is in the form of a plano-convex lens 15 in which the center of curvature of the convex surface coincides with the instantaneous center of rotation 0 and whose flat face forms a diametral plane, or one roughly so, of the corresponding sphere centered on 0. This optical element, called a half-ball or hemispherical lens, appears in the same way with respect to the reticle 2 when optical axis Z is offset with respect to normal axis Zo to detector plane 4 at 0, this plane coinciding with the flat face of element 15 or being near it. The assembly allows a big angular difference $\theta$ between axes Z and Zo which varies in a plane corresponding to a solid angle whose half-angle at the peak is big and may easily be 30° for example in the case of glasses whose refractive index is of the order of 1.5 for the useful radiation considered. The relative movement requires means 16 for driving one of the parts with respect to the other. In the example shown, assembly 1-2 is fixed together by a mechanical structure 17 and is driven in rotation around point 0 to produce offset angle $\theta$ required between axes Z and Zo. Also, reticle 2 must be driven in rotation round axis Z and device 16 can be designed to produce this rotation complementarily by driving assembly 1-2 through structure 17. The target useful image spot on the detector will be circular or elliptical depending on whether offset $\theta$ is zero or not, the elliptical form being due to a non-orthogonal slope of the detector plane with respect to optical axis Z. Since the field observed is unchanged, as the line of sight Z is fixed and the direction Zo is variable, the energy barycentre of the image spot remains unchanged because the respective energy distributions over the four quadrants are not modified. The luminous flux coming from the target is constant at the detection level, thus flux being modulated by the grills; the signals detected in each quadrant are independent of offset angle $\theta$ and the deviation measurement remains unchanged.

FIG. 7 and those which follow it refer to an example of a preferred embodiment of a direction finder as in FIG. 6 for realizing a homing missile. The main parts are shown in the general block diagram of FIG. 7 and include the reception objective and reticle assembly 20, a detector unit with its cooling device or cryostat 21, a gyroscope 22, processing and deviation measurement circuits 7, gyroscope electronic circuits 23, a radiation transparent dome 24 and auxiliary means 25 for starting the gyroscope which may be outside the system.

The input optical lens appears in more detailed fashion in FIGS. 8 to 10 in accordance with a catadioptric formula, which is known and combines a main mirror 30, a secondary mirror 31 and a corrective lens 32. Main mirror 30 is concave and hollow in the centre. It reflects the radiation received towards secondary mirror 31 which is convex and reflects the radiation again in the opposite direction towards the focal point through lens 32. The catadioptric formula used makes it possible to satisfy the restrictions laid down concerning in particular: a small focal length in order to use a detector of small dimensions, a guaranteed minimum pupil surface to obtain the homing system lock-on range and a sufficient quality of image over the whole of the instantaneous fields for an effective space filtering of the infrared sources to be done.

Space filtering and modulation reticle 2, which is arranged in the focal plane, is of the dimensions corresponding to the fields $\psi$ observed. There is provided by deposition on a support 33 of transparent material for the useful radiation expected, a substrate of germanium, for example, in the case of the proposed infrared radiation. Substrate 33 also acts as the first optical element in the deviation measurement optical objective.

Objective and reticle assembly 20 is fixed to the rotating part of gyroscope 22, the top of a gyroscope with a central gimbal in the example shown. The mechanical parts of the moving set-up referenced in FIG. 8 include: a magnet 35, a sheath 36 and first and second mechanical supports 37 and 38 of optical element. Support part 38 is fixed in a hollowed out center part of lens 32 and it is hollowed out at its other end to lighten the whole. It holds secondary mirror 31 and a sunshade 39.

The reticle 2 and the reception objective are therefore driven in rotation at the angular speed determined by the instantaneous spin of the gyroscope, which ensures the space filtering and the modulation of the infrared sources in the field observed.

The deviation measurement function, which is fully decoupled from that of the reticle, is obtained by the association previously described of a cell 4 with four quadrants and an optical element formed of a half-ball part 15. This assembly is fixed with respect to the missile and is fitted in the gimbal 40 of the gyroscope, the center of rotation corresponding substantially to the center of detector 4. During a movement of offsetting between optical axis Z and axis Zo corresponding to the longitudinal missile axis (FIG. 10), the input objective and reticle assembly rotates relative to the deviation measurement assembly.

In this movement, the whole energy figure seen by the cell remains globally unmoved because the deviation measurement assembly has a constuction geometry which respects the point symmetry round the center of rotation of the moving set-up.

It is considered that the reticle used corresponds to the pattern of the disc as in FIG. 4 to differentiate between a central zone and a peripheral zone and reduce the possibility of false lock-ons during the search phase in the full field and during tracking in the central field. Also, each zone is made with the tracks offset as in FIG. 5 to increase and homogenize the space filtering. The modulation frequencies may be fixed in a ratio k between 2 and 2.5 for example. This reticle pattern also makes it possible to eliminate the part added by the background in the peripheral zone when in the tracking phase and to separate by filtering of the signals detected a linear deviation measurement field for the central field corresponding to $\pm 1°$ for example and a saturated deviation measurement field for the peripheral field which may reach to $\pm 2°$, by using the change in modulation frequency produced by the passage of the useful image from one zone to the other.

The deviation measurement objective placed between the reticle plane and the photosensitive detection plane may be made in a very small volume compatible with the dimensions of the central gimbal. A way of making this is shown more in detail in FIG. 9 which shows the projection of the luminous beam coming from reticle 2 on the four quadrant cell 4. The aperture of the input objective fixes the dimension of the useful diameter of detector 4.

Element 33 is formed by a plano-concave lens of germanium or other suitable material and is very thin along the the axis. The reticle 2 is arranged on the flat face and the concave spherical face may have its center of curvature with advantage at the center of rotation as is the case for the convex face of half-ball 15. In this way, the air space between lenses 33 and 15 is mechanically invariable no matter what the offset angle $\theta$. Support lens 33 is fixed to the moving part of the gyroscope together with the mirror input objective and the whole rotates about optical axis Z. This element is also driven around the instantaneous centre of rotation formed by the geometrical center of gimbal 40 in the gyroscope.

Plano-convex or half-ball lens 15 may also be made of a germanium material which is transparent to the wavelengths used for operation.

Optical filter 3 is with advantage made in the form of a cold filter of small dimensions and consists of a flat piece of silicon (FIG. 9) whose rear face is at the level of the photosensitive plane of detector 4 and whose front face is separated from the flat output surface of half-ball 15 by a layer of air in order to ensure sufficiently fast cooling of the detector and filter. Detector 4 is combined in conventional fashion with a cooling device, the whole occupying a cylindrical volume shown schematically in FIG. 8. The flat detector properly speaking may be made for example of indium antimonide material.

The gyroscope is intended to decouple the optical axis from the movements of missile axis Zo. The gyroscope construction can have a universal joint, a ball joint or any other gyroscopic device. In the version shown in axial section in FIG. 8 the gyroscope consists of: a ball joint with bearings 40 to 42, a gyroscope top 30 to 32 and 35 to 39, a solenoid with precession control 43, a top position detector device 44 and an electric motor for starting up. This last item may be arranged as shown partly outside the system, the coils 25 forming the stator and the magnet 35 the rotor. The electronic control circuits 23 (FIG. 7) are connected to coils 43 and 25 and the position feeler 44 is connected to processing circuits 7 which also receive the signals detected. The gyroscope starting up device may be designed in accordance with other known techniques such as a rate gyro started by a spring, by a powder or compressed gases.

The transparent dome 24 also called irfome or infrared dome, by analogy with radome for electromagnetic waves used in radar, is of a material which is transparent in the operating spectral band and it may be spherical or pyramidal in shape.

The electronic processing and deviation measurement part described below is proposed on the assumption that the gyroscope is initially started up and that its rotational speed (frequency FG) decreases in time because of mechanical losses and on the complementary assumption that the self-guidance equipment is fitted on board a missile whose roll rotation is uniform (frequency FR). This does not exclude the other cases of operation with a constant gyroscope rotational speed and no roll.

Electronic processing of the signals detected gives the following main functions: preamplification and amplification of the signals delivered by the four quadrants of the detector with continuous control of the channel gain, production of the difference $\Delta X$ and $\Delta Y$ and sum $\Sigma$ channels, filtering in a narrow frequency band enslaved to the absolute modulation frequency, synchronous demodulation of the difference channels $\Delta X$ and $\Delta Y$ by the $\Sigma$ channel for the production of the homing system and missile deviation measurements, postintegration by low pass filtering of the deviation measurements, servo-control at constant level by control of the gain in the sum channel $\Sigma$ and production of the functional signals, self-guidance locked on and deviation measurement saturated, control of the center tuning frequency for the filters and processing of the peripheral channel.

The processing is designed to be obtained with circuits whose technology is simple, classical and integratable.

The block diagram in FIG. 11 shows a corresponding layout of the various functions mentioned.

The position of the image spot on the detector is characteristic of the offset $\epsilon$ of the target in the instantaneous fields. Each quadrant will then intercept a fraction of the luminous energy, which is a function of the elevation $\epsilon S$ and bearing $\epsilon G$ angles to be measured to which the coordinates YC and XC of the image spot center correspond (FIG. 2).

The signal current delivered by a quadrant is proportional to the luminous energy it receives. After preamplification in the preamplifier circuits 50-1 to 50-4, the signals of the four channels $V_1$, $V_2$, $V_3$ and $V_4$ are processed. The elevation deviation measurement is directly related to the different $\Delta Y$ between signals $(V_1+V_2)$ and $(V_3+V_4)$ and the bearing deviation mesurement to the difference $\Delta X$ between signals $(V_1+V_4)$ and $(V_2+V_3)$.

In order to be freed of variations in these differences due to the total power received by the cell (represented by $V_1+V_2+V_3+V_4$), the deviation measurement signals used are:

—elevation deviation measurement $ES = \dfrac{(V_1 - V_3) + (V_2 - V_4)}{V_1 + V_2 + V_3 + V_4}$ $ES = \dfrac{\Delta Y}{\Sigma}$ —bearing deviation measurement $EG = \dfrac{(V_1 - V_3) - (V_2 - V_4)}{V_1 + V_2 + V_3 + V_4}$ $EG = \dfrac{\Delta X}{\Sigma}$ The deviation measurements are therefore limited functions of the two preceding angles $\epsilon S$ and $\epsilon G$, their limits being $+1$ and $-1$. For a zero angular offset, $\epsilon=0$, $\epsilon S=\epsilon G=0$ and $ES=EG=0$ since the detection and amplification channels are identical.

The principal of the deviation measurement production retained consists in enslaving the signal level of the sum channel representing the total energy received by the four quadrants of the detector to a reference level. Demodulation of the difference channels $\Delta X$ and $\Delta Y$ gives the constant gradient deviation measurements. This solution is preferred to the use of standardizing dividers because, by using the necessary gain control function, it makes it possible to function at optimum levels in the filter and demodulation stages and to obtain easily the deviation signals.

Circuit 51 contains summators producing, by sum and difference, the signals $\Delta X$, $\Delta Y$ and $\Sigma$ which are then amplified by amplifiers 52-1 to 3 before being applied to filter circuits 53-1 to 3 of the central reception channel, which is thus named by analogy with the central track of the disc. The amplified signals are transmitted simultaneously to the circuits of the peripheral channel corresponding to the peripheral track of the disc which will be described later. Filters 53 are of the digital servo-controlled filter type. They are controlled by a circuit controlling the tuning frequency 54 so that they have a center tuning frequency corresponding to modulation frequency F1 produced by the center track. If N represents the number of pairs of sectors and FG the absolute frequency of rotation of the gyroscope, then $F1=N\times FG$. Servo-controlled filters 53 are selective, their pass band may be 200 Hz for example and the center frequency F1 varying in a range centered on about 4 kHz. The filtered outputs of the $\Delta X$ and $\Delta Y$ channels are applied to the synchronous demodulators 55-1 and 2 which receive at a second input the sum signal $\Sigma$ after filtering. In order to improve the signal to noise ratio, the substantially D.C. deviation signals delivered by demodulators 55 are applied to low pass filter circuits 56-1 and 2 which give a post-integration, the pass band of these filters being very narrow, 0 to 30 Hz for example. The deviation signals $ES_c$ and $EG_c$ of the center channel finally obtained are passed to the selector circuit 57. Continuous control of the channel gain and servo-control of the channel level are obtained by applying the filtered signal to a level detector 58 and then to a comparator 59 in which the level detected is compared with a reference level VR1 to give a difference signal intended for the automatic gain control of amplifiers 50 and 52. The AGC loop makes it possible to be free of brightness variations in the source to be detected, which might cause saturation of the ampifiers, and ensure a constant linear deviation measurement slope in the center channel.

The angular position detector 44 of the gyroscope delivers a signal at the absolute frequency FG of rotation of the top, which is increased in value and sign by the roll frequency FR due to rotation of the missle round its longitudinal axis ZO. The direction of roll is such, for example, that the frequencies add together. The roll frequency information is given by an auxiliary sensing device 60 which is part of the missile properly speaking. The corresponding signals FR and FG+FR are applied to circuit 54 controlling the filter tuning frequency. The time base circuit 61 produces a clock signal formed by a pulse train at frequency FH. The circuit 62 determines by counting the pulse H the incident frequencies FR and FG+FR and, with the digital counting data, addresses a preprogrammed memory circuit 63, which in turn delivers in digital form the tuning value for filters 53-1 to 3 to filter modulation F1 corresponding to N+FG. Allowing for sinusoidal incident signals, circuit 62 may be designed with the help of input signal limiting circuits and counter circuits synchronized by clock H. Control circuit 54 contains a second memory circuit 64, which is similar to the preceding one, to control the tuning of the filters 71-1 and 2 in the peripheral channel at frequency F2 of the peripheral track. Each of memory circuits 63 and 64 may be produced with the help of PROMs so programmed and combined as to produce data F1 and F2 respectively with a prearranged tolerance, so as to store a limited number of digital data in the memories. Such a construction is not described in detail as it is outside the scope of the invention, and is a function of the algorithm used.

The peripheral channel is formed in a manner similar to that of the channel to within a few details. It receives the signals from the $\Delta X$, $\Delta Y$ and $\Sigma$ channels after amplification at its input. Channels $\Delta X$ and $\Delta Y$ are reduced to a single channel by a switching circuit 70 which switches the signals alternately to the servo-controlled filter circuit 71-1 which is followed as before by a synchronous demodulator 72 whose output is connected in parallel to the input of two memory circuits 73-1 for the $\Delta X$ channel and 73-2 for the $\Delta Y$ channel. The sum channel $\Sigma$ also contains a servo-controlled filter 71-2 and a comparator circuit 74 with a threshold VR2 which delivers at its output a signal S10 of value 1 or 0 depending on whether the threshold is exceeded or not, i.e. the value 1 is significant of the presence of the target image spot in the peripheral zone. In the same way, comparison means 59 of the center channel produce a signal S11 of value 1 when the level of the center channel is greater than the threshold fixed and it indicates the presence of the image spot in the center zone. Signals S10 and S11 control a decision logic circuit 75, which, in its turn, controls the switching in or not of the peripheral channel. When S10=0 and S11=1, the output S12 control switching circuit 70 in the off position and data $\Delta X$ and $\Delta Y$ are not passed to the peripheral channel. On the other hand, when S10=1 and S11=0, output S12 controls alternately the connection of channels $\Delta X$ and $\Delta Y$ to the input of filter 71-1 and the corresponding storage in the memory takes place in synchronism with an instruction output S13. Decision logic 75 can easily be made using logic gate circuits and a local clock to time the channel switching at 70 and the recording in 73-1 and 2. The deviation measurement signals $EG_p$ and $ES_p$ of the peripheral channel are passed to selector circuit 57 which is also controlled by logic circuit 75 to deliver deviation signals EG and ES of the central of peripheral channel depending on the case. The deviation measurement produced by the peripheral channel is of the all or nothing type. Signals EG and ES are passed for use to the missile to ensure proportional navigation by modifying the trajectory. They are also passed to the self-guidance equipment gyroscope and to precession coils 43 through circuit 23 to obtain alignment of the top axis on the target.

In the design in which the missile does not roll (FR=0), tuning control circuit 54 is simplified as it no longer receives the data FG from position detector 44. If, complementarily, the gyroscope rotational speed is kept constant (FG=k), control circuit 54 is eliminated and filters 53-1 to 3 and 73-1 and 2 are fixed frequency filters tuned to the values F1 and F2 arranged respectively for each channel.

The construction described is applicable advantageously to a passive infrared homing apparatus. However, it must be considered that this application is not limiting. The system may be installed on the ground for example and the structure is much simplified if no relative movement is proposed between the reception objective—reticle assembly and the detection part.

What is claimed is:

1. A photoelectric direction finder for detection and angular location of a light-radiating target, comprising:
   optical reception means for focusing radiation coming from an observed field;
   optical filtering means for selection of the radiation received from said target;
   reticle means in the form of a revolving disc centered on the optical axis of said optical reception means and having a reticle pattern on one planar surface thereof for modulating and spatial filtering of the focused radiation, the reticle pattern being located substantially in the focal plane of the optical reception means and comprising at least one optical circular track formed of a uniform array of alternate opaque and transparent radially extending sectors to modulate said radiation at a determined modulation frequency;
   detection means comprising a four quadrant detector at a distance from said reticle means, and an intermediate optical objective for transposing the focused field image on said detector;
   means for relative movement of the assembly comprising said optical reception means and said reticle means with respect to said detection means, by rotation around an instantaneous center of rotation which coincides substantially with the center of said detector; and
   circuits for processing and deviation measurement of four reception channels issued from said detection quadrants respectively, to demodulate the signals detected and produce deviation signals representing the angular offset of the target direction with respect to a reference measurement axis.

2. A finder as set forth in claim 1, wherein the reticle pattern is formed by several concentric optical tracks comprising, a first track covering a circular central zone and producing a first modulation frequency and at least a second track to cover the remaining peripheral zone of the image of the field observed and to produce at least a second modulation frequency of higher value than that of the first frequency.

3. A finder as set forth in claim 2, wherein the sectors forming each modulation track are subdivided into a series of tracks, which are concentric and offset one with respect to the next in accordance with a prearranged radial variation law of the corresponding phase shift.

4. A finder as set forth in claim 3, wherein the intermediate objective contains a plano-convex optical element of the half-ball type in which the center of curvature of the convex spherical surface coincides substantially with the geometrical center of the four quadrant detector and the flat surface coincide substantially with the detection plane of said detector.

5. A finder as set forth in claim 4, wherein the disc is formed by a plano-concave lens on whose plane surface the reticle pattern is provided and in which the center of curvature of the concave spherical surface coincides with the instantaneous center of rotation, the ratio of curvature of the plano-concave and half-ball lenses being so fixed as to give an air layer of constant thickness between the two and allow relative movement.

6. A finder as set forth in claim 5, wherein the optical filter is in the form of a flat piece placed in the photosensitive plane of the four quadrant detector.

7. A finder as set forth in claim 6, wherein a layer of air is arranged between the flat surface of the half-ball lens and the corresponding surface of the filter piece opposite it.

8. A finder as set forth in claim 7, wherein the optical reception and reticle means assembly is fixed on the part of a gryoscope moving in rotation and the said detection means on the center part of the gyroscope.

9. A finder as set forth in claim 8, wherein the gyroscope is of the central ball-joint type with bearings, the reception lens fixed on the top being of the catadioptre type consisting of a main concave mirror, a secondary convex mirror and a corrective lens, the instantaneous center of rotation corresponding to the geometric center of the ball-joint.

10. A finder as set forth in claim 9, wherein the processing and deviation measurement circuits contain four reception channels issued from detector and processed by summation in a circuit to produce the conventional deviation measurement $\Delta X$, $\Delta Y$ and $\Sigma$ signals, these last signals being passed in parallel to a channel of circuits called the central one and to a channel called the peripheral one in which filter circuits ensure the filtering of the corresponding modulation frequency of the center and peripheral tracks respectively, the center channel circuits produce a linear type deviation measurement and those of the peripheral channel an all or nothing type of measurement.

11. A finder as set forth in claim 10, wherein summation circuit is preceded by preamplifiers and followed by amplifiers of the variable gain type controlled by the sum signal $\Sigma$ after processing in a level detection circuit followed by a threshold comparator circuit while the filter circuits are of the digitally controlled tunable type, their control being ensured by a circuit which receives the rotation frequency data concerning the top of a position detector mounted on the gyroscope.

12. A finder as set forth in claim 11, used in the infrared field and, in particular, to make a passive infrared homing apparatus, wherein the intermediate objective is of germanium material, the optical filter of silicon and the detector of indium antimonide and wherein the detector and optical filter are cooled by a cryostat.

13. A finder as set forth in claim 1, wherein the intermediate objective contains a plano-convex optical element of the half-ball type in which the center of curvature of the convex spherical surface coincides substantially with the geometrical center of the four quadrant detector and the flat surface coincides substantially with the detection plane of said detector, and wherein the disc is formed by a plano-concave lens on whose plane surface the reticle pattern is provided and in which the center of curvature of the concave spherical surface coincides with said instantaneous center of rotation, the ratio of curvature of said plano-concave and half-ball lenses being so fixed as to give an air layer of constant thickness between the two and to allow relative movement.

14. A finder as set forth in claim 13, wherein the optical filter is in the form of a flat silicon piece placed in the photosensitive plane of the four quadrant detector, with a layer of air arranged between the flat surface of the half-ball lens and the corresponding surface of the filter piece opposite it.

15. A finder as set forth in claim 14, wherein the optical reception and reticle means assembly is fixed on the part of a gyroscope moving in rotation and said detection means on the center part of the gyroscope which is of the central ball-joint type with bearings, the reception lens fixed on the top being of the catadioptre type consisting of a main concave mirror, a secondary convex mirror and a corrective lens, the instantaneous center of rotation corresponding to the geometric center of the ball-joint.

16. A finder as set forth in claim 13, wherein the reticle means comprises two concentric optical tracks, a first track covering a circular central zone and producing a first modulation frequency and a second track to cover the remaining peripheral zone of the image of the field observed and to produce a second modulation frequency of higher value than that of the first frequency, and wherein the processing and deviation measurement circuits contain four reception channels issued from the detector and processed by summation in a circuit to produce the conventional deviation measurement $\Delta X$, $\Delta Y$ and $\Sigma$ signals, these last signals being passed in parallel to a channel of circuits called the central one and to a channel called the peripheral one in which filter circuits ensure the filtering of the corresponding modulation frequency of the center and peripheral tracks respectively, the center channel circuits produce a linear type deviation measurement and those of the peripheral channel an all or nothing type of measurement.

17. A finder as set forth in claim 15, wherein the reticle means comprise two concentric optical tracks, a first track covering a circular central zone and producing a first modulation frequency and a second track to cover the remaining peripheral zone of the image of the field observed and to produce a second modulation frequency of higher value than that of the first frequency, and wherein the processing and deviation measurement circuits contain four reception channels issued from the detector and processed by summation in a circuit to produce the conventional deviation measurement $\Delta X$, $\Delta Y$ and $\Sigma$ signals, these last signals being passed in parallel to a channel of circuits called the central one and to a channel called the peripheral one in which filter circuits ensure the filtering of the corresponding modulation frequency of the center and peripheral tracks respectively, the center channel circuits produce a linear type deviation measurement and those of the peripheral channel an all or nothing type of measurement.

* * * * *